(12) United States Patent
Samuels

(10) Patent No.: US 7,556,845 B2
(45) Date of Patent: Jul. 7, 2009

(54) FILM HAVING A LIQUID ABSORBED THEREIN

(75) Inventor: Brian R. Samuels, Frankfort, IL (US)

(73) Assignee: Vector USA Inc., Oak Brook, IL (US)

( * ) Notice: Subject to any disclaimer, the term of this patent is extended or adjusted under 35 U.S.C. 154(b) by 299 days.

(21) Appl. No.: 10/798,462

(22) Filed: Mar. 11, 2004

(65) Prior Publication Data

US 2004/0197583 A1  Oct. 7, 2004

Related U.S. Application Data

(60) Provisional application No. 60/501,339, filed on Sep. 8, 2003, provisional application No. 60/454,444, filed on Mar. 13, 2003.

(51) Int. Cl.
*A22C 13/00* (2006.01)
*B32B 1/00* (2006.01)

(52) U.S. Cl. .................. 428/34.8; 428/34.1; 428/34.2; 428/35.7; 428/35.8; 428/35.9; 428/36.9; 428/36.91

(58) Field of Classification Search ............... 428/34.1, 428/35.7, 35.9, 36.9, 34.2, 34.8, 36.91, 35.8
See application file for complete search history.

(56) References Cited

U.S. PATENT DOCUMENTS

| | | | |
|---|---|---|---|
| 3,378,379 A | 4/1968 | Shiner et al. | |
| 4,560,520 A * | 12/1985 | Erk et al. | 264/458 |
| 5,859,145 A * | 1/1999 | Ching et al. | 525/330.6 |
| 6,200,613 B1 | 3/2001 | Schafer et al. | |
| 6,352,762 B1 * | 3/2002 | Shimizu et al. | 428/323 |
| 2003/0031765 A1 | 2/2003 | Luthra et al. | |

FOREIGN PATENT DOCUMENTS

| | | |
|---|---|---|
| CA | 2 380 778 | 10/2002 |
| EP | 0 010 632 | 5/1980 |
| EP | 0 797 918 | 10/1997 |
| EP | 0 920 808 | 6/1999 |
| EP | 0 986 957 | 3/2000 |
| EP | 1 380 212 | 1/2004 |
| GB | 2 009 033 | 6/1979 |
| WO | WO 97/36798 | 10/1997 |
| WO | WO 98/31731 | 7/1998 |
| WO | WO 02/078455 | 10/2002 |
| WO | WO 02/085129 | 10/2002 |
| WO | WO 03/028470 | 4/2003 |
| WO | WO 03/086087 | 10/2003 |

* cited by examiner

*Primary Examiner*—Marc A Patterson
(74) *Attorney, Agent, or Firm*—Marshall, Gerstein & Borun LLP

(57) ABSTRACT

The present invention relates to a film having a liquid at least partially absorbed therein, wherein the liquid has been applied to a surface of the film and prior to application of the liquid to the surface, the surface has been subjected to a surface activation treatment such that the surface has a surface energy of at least about 50 dynes.

20 Claims, 5 Drawing Sheets

VECTOR 230 mm
SMOKE
COATED

CONTROL
HAM

CONTROL
TURKEY

VECTOR 195 mm
SMOKE
COATED

FILM HAVING A LIQUID ABSORBED THEREIN

CROSS REFERENCE TO RELATED APPLICATIONS

This application claims the benefit of U.S. provisional patent application Ser. No. 60/501,339, filed Sep. 8, 2003, and U.S. provisional patent application Ser. No. 60/454,444, filed 13 Mar. 2003.

FIELD OF THE INVENTION

The present invention relates to a film having a surface with a liquid at least partially absorbed therein. In particular, the present invention relates to a film for use as a packaging for a food product and especially relates to a tubular food casing for food, which is to be cooked or otherwise heated within the casing.

BACKGROUND OF THE INVENTION

The present invention will be described with particular reference to a film for use in packaging food. However, it will be appreciated that the film of the present invention may have applications and uses other than in the food industry and no limitation is intended thereby.

There are a number of applications for articles having a material with a liquid absorbed onto a surface thereof. Such applications include "patches" as used for slow release topical administration of therapeutic agents and food casings for release of a flavouring and/or colouring agent into the food encased therein. However, the types of materials which can be used to form such articles are strictly limited to those having suitable absorption or permeability properties for the desired liquid.

In practice, this has severely restricted the types of materials which may be used. Generally for hydrophilic liquids, the materials used are cellulosic materials and derivatives or modifications of water soluble polymers such as polyacrylamide, polyvinyl alcohol, polyvinylpyrolidone and the like. These materials are typically modified such that the articles formed therefrom are no longer water soluble but are able to absorb at least some water. The polymers may be crosslinked and/or blended or copolymerised with less hydrophilic and/or hydrophobic polymers or monomers. A particular application of a film having a liquid absorbed therein are cellulosic food casings having a smoke flavouring agent known as "liquid smoke" absorbed therein. Such casings have been developed to be able to apply a smoke flavour and/or colour to a food product as an alternative to the traditional smoking process.

The traditional smoking process involves stuffing a food to be smoked, such as a sausage, into a smoke permeable casing and hanging the stuffed food product in a smoke house in which wood was burned at low temperature to generate smoke. Smoking by such traditional techniques is labour intensive, time consuming (with smoking times being up to a number of days) and the level of smoke generated often conflicts with pollution laws.

In order to provide the benefits of a smoked product but without the drawbacks of conventional smoking techniques, liquid smoke was developed some 65 years ago. Liquid smoke is the aqueous condensate of natural wood smoke, which contains aldehydes that react with proteins in the meat resulting in browning of the meat surface. This browning can give the appearance of a naturally smoked product Liquid smoke was originally sprayed onto meat products encased in porous natural gut or cellulose casings prior to cooking by placing in an oven. The porosity of the casings allowed the liquid smoke to penetrate the casing and into the meat. In practice, however, it has been found that with this spraying process it is difficult to provide a uniform coating to the product. Further, the liquid smoke spray tended to run down the sides of the stuffed casing and gather at the lower end thereof. This uneven coating of liquid smoke resulted in a product having an undesirable blotchy appearance.

In the light of these difficulties, much work has been conducted with a view to providing a substantially uniform distribution of liquid smoke onto the surface. Some attempts have been made to incorporate liquid smoke into the meat product itself. However, this provides either an insufficient amount of agent on the surface to provide the desired colour, or imparts an excessively smoky flavour to the product.

A more successful approach has been to incorporate liquid smoke into a cellulose casing or absorb liquid smoke onto the surface of a cellulose casing. Techniques for absorbing liquid smoke onto a cellulose casing include dipping or spraying the cellulose casing with a liquid smoke solution so that the liquid smoke permeates to the interior surface for eventual transfer to an encased product. Such external treatment can present difficulties with further processing of the cellulose casings and in particular, may interfere with shirring. Despite these difficulties, there are a number of liquid smoke treated cellulose casings on the market.

The permeability and porosity of cellulose casings which on the one hand, makes them compatible for use with liquid smoke, on the other hand introduces serious and widely recognized disadvantages. First, cellulose products are highly permeable to water vapour. This allows moisture loss during cooking and a corresponding decrease in overall weight of the product. This results in a reduced yield of product, which is disadvantageous for commercial reasons. Further, cellulose casings are also oxygen permeable which leads to spoiling and/or discolouration of the food product. As a result of this latter difficulty, food products cooked in cellulose casings must either by consumed shortly after cooking, or be removed from the casings and wrapped a second time as quickly as possible after production with an oxygen impermeable barrier casing. This rewrapping step provides an opportunity for contamination or infection of the food product that represents a loss in quality and shortening of shelf life. Further, the additional steps add to costs.

To address the disadvantages of permeable cellulose casings, water and oxygen impermeable thermoplastic casings were developed. When using casing of this type, there is negligible loss in weight during the production process or during storage and shipping. Further, the product can remain sterile provided the casings remain intact. However, as a result of the impermeability of the casing, smoke in either gaseous or liquid form cannot penetrate the casing. Further, impregnation of thermoplastic casings with liquid smoke or other colouring additives has not been successful since the plastics used cannot adequately absorb and store impregnating agents. In order to impart a smoke colour to plastic encased products, it is necessary to remove the casings and apply smoke by techniques such as spraying or dipping liquid smoke or atomizing and the product repackaged. These additional steps not only increase cost but increase the risk of contamination.

Another approach has been to provide a cellulose/plastic laminate, the inner cellulose layer having a coloring agent absorbed therein and the plastic intended to provide an oxygen barrier layer. In practice however, when meats are cooked in packages formed from this material, juices collect between the meat and package. Such a condition is known as "cookout" or purge. This is undesirable from a consumer acceptance point of view. Further, it has been observed that there is a tendency for flaking or chipping of the cooked meat surface during slicing.

There is a recognized need in the industry to provide a gas and moisture impermeable casing having a food additive such as liquid smoke absorbed therein. However, to date all attempts to solve this problem and provide a commercially acceptable product have failed for one reason or another. One approach has been to blend a liquid smoke with a resin used for the inner layer of a plastic casing. This has been unsuccessful for a number of reasons including reaction and volatilization of the liquid smoke at extrusion temperatures and delamination induced by the presence of the additive.

Another approach has been to incorporate an absorbent additive into an impermeable plastic casing material. However, such a product has yet to be adopted commercially and in tests conducted by the present inventor on one such material, have shown that there is still insufficient absorption of liquid into the film and excess liquid remains on the surface of the film.

If this excess liquid is not removed, the colour and flavour additives do not remain evenly dispersed on the film surface during subsequent processing such as shirring and stuffing. The result is non uniform transfer of colour and flavour to the surface of the product.

If the excess liquid is removed by wiping, very little of the colour and flavour additives remain absorbed in the film structure and little or no colour and flavour is transferred to the product surface.

If the casing is in the form of a flat sheet the excess liquid may be removed by applying heat to dry off the moisture leaving the colour and flavour additives as a coating on the film surface. However, heating may be difficult or not possible if the film is a heat shrink film. The casing can then be formed into a tube to encase the food product. A delicate balance is required to have the coating adhere sufficiently to the casing surface to withstand shirring and stuffing operations and yet release to the surface of the food product during processing.

If the casing is in the form of a tube, the liquid containing colour and flavour solution can be added to the inside of the tube by well known techniques known as slugging but there is no practical method to remove the excess liquid. Therefore sufficient flavour and colour cannot be added without non-uniform transfer to the product surface.

It will be appreciated that in other applications unrelated to the food industry, it may also be desirable to provide an alternative to those materials currently used in applications where it is desirable to have a liquid at least partially absorbed therein. It is therefore an object of the present invention to provide a film having a liquid at least partially absorbed therein and a method for producing such a film that may at least partially overcome the above disadvantages, or provide the public with a useful or commercial choice.

DESCRIPTION OF THE INVENTION

In a first aspect of the present invention, there is provided a film having a surface with a liquid at least partially absorbed therein, whereby prior to the liquid being applied to the surface, the surface has been subjected to a surface activation treatment such that the surface has a surface activity of at least about 50 dynes.

The present invention relates to the surprising and unexpected discovery that by subjecting a surface of a film to a surface activation treatment, the surface may be coated with a layer of a liquid such that the liquid solution is at least partially absorbed into the film.

At least partially absorbed in to the surface is to be understood to mean that there is at least some impregnation of the liquid into the surface as opposed to a coating which remains on the surface.

According to a further aspect of the present invention, there is provided a method of preparing a film having a liquid at least partially absorbed therein, the method including the steps of subjecting a surface of the film to a surface activation treatment such that the surface has a surface energy of at least about 50 dynes, applying a liquid to the surface such that the liquid is at least partially absorbed into the film.

The film of the present invention may be any suitable film for the desired end use. Preferably, the film is for packaging a food product. More preferably, the film is a cook-in film. The film is formed from one or more polymeric materials, present in one or more layers. The polymeric material may be any suitable material which may be processed as a film in either mono-layer or multi-layer configuration. The polymeric material may be a synthetic or non-synthetic polymer or a mixture or blend thereof. Suitable materials for use in multi-layer films for food packaging applications include a food contact layer and one or more other layers selected from sealant layers, abuse layers, bulk layers, oxygen barrier layers, moisture barrier layers, tie layers and the like. The nature of these additional layers forms no part of the present invention. Those of ordinary skill in the art are aware of suitable polymers and blends thereof for use in the construction of food packaging films. Typical materials are known in the art and include polyolefin materials such as low density polyethylene, linear low density polyethylene, high density polyethylene, and higher alpha olefins such as polypropylene, polybutylene; ionomer resins, olefin copolymers with vinyl monomers such as ethylene vinyl acetate, ethylene acrylic acid or blends thereof; polyvinyl chloride, polyvinylidene chloride, polystyrene and blends and/or copolymers thereof.

An especially preferred material for the surface activation treatment is a hydrophilic material such as a polyamide material. Suitable polyamides are known in the food packaging art and include aliphatic polyamides such as homopolycondensates of aliphatic primary diamines having, in particular, 4 to 8 carbon atoms and aliphatic dicarboxylic acids having, in particular, 4 to 10 carbon atoms and blends or mixtures thereof. The aliphatic copolyamide may be the same homopolycondensate or homopolymer, and may be a polymer based on one or more aliphatic diamines and one or more aliphatic dicarboxylic acids and/or one or more omega-aminocarboxylic acids or omega-aminocarboxylic lactams. Examples of suitable dicarboxylic acids include adipic acid, azelaic acid, sebacic acid and dodecane dicarboxylic acid. The film may also include an additive to facilitate adherence or absorption of the liquid. Suitable additives may include water soluble or water swellable materials such as starches, celluloses including alpha cellulose, poly ethylene oxides, poly vinyl alcohol, polycyclic acid, crosslinked polyvinylpyrrolidone (PVPP) and polyvinylpyrollidone (PVP) copolymers, mixtures and blends thereof. A preferred material is PVP or PVPP.

The surface of the film may also be treated to increase the surface area thereof. Such methods of surface treatment are known and include ablation and etching. Alternatively, the surface may be roughened during extrusion by a number of methods including extruding through a roughened die, or setting the melt and die temperatures so as to create a non-uniform or turbulent flow. Alternatively, the polymer may be blended with additives that can promote melt fracture or modify flow. On the other hand, in some cases, processing aids are added to control melt fracture. The levels of these aids may be reduced or modified to give the desired effect.

For some applications such as food packaging, the film is heat shrinkable such that it may conform tightly to the food product. The film may be a cook-in film in which case it shrinks during cooking. Alternatively, the film may be shrunk prior to packaging the food product by placing the package in a heated environment.

Typically, for food packaging purposes, the film is in the form of a seamless tubular casing. Such casings may be prepared by methods known in the art. Alternately, the film may be formed as a single sheet, surface activated, coated and then formed into a tube by sealing the edges together. The process to form a single sheet into a tube by sealing is well known in the art and is known as back seaming. It is used on form and fill machines.

The surface activation treatment may be any suitable treatment method such as plasma, flame, corona discharge, UV irradiation, electron beam irradiation, gamma irradiation and the like. The surface may also be treated chemically by subjecting the surface to oxidizing or etching agents. A preferred treatment is corona discharge.

It is known to treat a polyolefin material by corona discharge so as to improve the wettabilty of the surface so as to facilitate printing. Typically the polyolefin is treated to increase the surface energy from about 30-32 dynes up to about 37-40 dynes. The power levels required to provide such increases in dyne level depend to some extent on the nature of the material to be treated and any additives therein. Different materials may react differently. For example, polyesters are known to require relatively low power levels of from about 8 to 11 $W-m/M^2$, whereas polypropylene requires relatively "high" levels of about 22 to about 27 $W-m/M^2$. Higher corona treatment levels are considered to be undesirable as it is believed there is a breakdown of the polymer surface and release of low molecular weight products which actually reduces the ability of the surface to bond to an ink or the like.

Treatment of a polyolefin layer that forms an interior surface of a tubular food casing by corona discharge is also known. The purpose of such treatment is to improve the meat adherence properties of the surface. Typically polyethylene is treated such that the surface energy of the film is increased to between about 40 to 50 dynes. A certain degree of adhesion to meat is desirable to avoid purge. However, excessive adhesion is also undesirable as the film does not release cleanly from the meat surface and part of the meat is pulled away from the film. This results in a scarred and unsightly appearance. Excessive adhesion is typically observed where the surface activity of the film exceeds about 50 dynes. Corona treatment of the interior surface of a tubular casing has been described in U.S. Pat. No. 5,296,170. Polyamide casing materials which have a surface energy in the order of up to about 45 dynes generally have sufficient meat adherent properties and corona treatment is not required. It is believed that if a polyamide was corona treated, the resulting film would adhere excessively to a meat surface, causing the above-mentioned problems.

Surprisingly it was discovered that when the corona treatment level was increased well above known commercial use, a liquid could be absorbed into the film. Further where the film was a cook-in food packaging article, the film did not unduly adhere to the meat surface.

It will be appreciated that the level of surface treatment to which a surface is subjected will vary depending upon the nature of the substrate and the surface activation treatment and the amount of the liquid to be absorbed. The necessary level of treatment for a particular substrate may be determined by a person of skill in the art. Typically, the surface is treated so as to provide a coating absorbed level of at least about 0.40 and up to about 10 $mg/cm^2$, preferably at least about 1.0-3.0 $mg/cm^2$. Where the surface is treated by corona treatment, the surface is typically treated at a Watt density of between about 50 to about 1000 $watt/min/m^2$, most preferably from about 100 to about 600 $watt/min/m^2$. The film may be treated with one or more sets of electrodes in series. The total watt density may be split as desired between the electrodes.

The liquid may be any suitable liquid depending upon the desired end use. It will be appreciated that the term liquid refers to any flowable material and includes pure liquids, aqueous or non-aqueous mixtures, suspensions, emulsions, solutions and compositions which may or may not contain solids such as suspended particulate materials.

Typically, the liquid includes additives which may either modify the properties of the film and/or be transferred to an article in contact with the film. For example, in therapeutic applications, the additive may be a therapeutic agent such as a drug, vitamin, conditioning agent or the like.

Where the film is for use in food packaging, the liquid typically comprises a colouring and/or flavouring agent with optional additives such as binders, gelling or thickening agents, surfactants and the like. Preferably, for cook-in purposes, the colouring agent is of the type that reacts with proteins in food by the Maillard reaction, which produces a brown colour characteristic of smoked meat. The Maillard reaction may also imparts a smoky flavour to a food. Maillard reagents may be considered to be both a coloring and a flavoring agent. Compounds that react with proteins in this manner are active carbonyl compounds such as hydroxyacetaldehyde and reducing sugars such as fructose, glucose, ribose, lactose, xylose and the like. In the present specification, the general term "Maillard Reagent" will be used to refer to any one or more of such compounds. Preferred Maillard type colouring agents are liquid smoke or colouring agents available under the tradename Maillose as available from Red Arrow. The Maillose agents are formed from pyrolysis of sugars and starches. Liquid smoke is a collection of condensable products from pyrolysis of wood or cellulose. Liquid smoke includes active carbonyl compounds with hydroxyacetaldehyde typically being the major carbonyl product. Especially preferred colouring agents are those that comprise a relatively concentrated amount of a Maillard reagent. Especially preferred is a colouring agent comprising between about 20 wt % to about 40 wt %, most preferably between about 30 wt % to about 35 wt % hydroxyacetaldehyde.

Other colouring agents may be used instead of, or in addition to, the Maillose type colouring agents. Such further colouring agents are well known in the art and include caramel, beet extract, malt and bioxin.

Especially preferred compositions are currently under development by Red Arrow. Such compositions include at least one viscosity modifying agent, a surfactant and a Maillard type coloring agent. Viscosity modifying agents suitable for use in contact with food are well know in the art and include materials such as cellulose, methyl cellulose, hydroxypropyl cellulose, starch, chitin, carrageenan, konjac, guar gum, xanthan, alginic acid and derivatives thereof, agar, pectin, gelatine and the like. Preferred viscosity modifying agents are water-soluble cellulose ethers such as, methylcellulose, hydroxypropyl methylcellulose, hydroxypropylcellulose, ethyl methylcellulose, hydroxyethylcellulose, ethyl hydroxyethylcellulose and preferably the anionic water-soluble cellulose ethers such as, carboxymethylcellulose and carboxymethyl hydroxyethylcellulose. Mixtures of water-soluble cellulose ethers may also be employed. Particularly preferred cellulose ethers are the methyl cellulose ethers under the trade name Methocel. Typically, the composition includes up to about 2.0 wt %, preferably up to about 1.0 wt % of a viscosity modifying agent.

A preferred composition includes between about 0.05 to about 0.5%, most preferably between about 0.125 and 0.25 wt % of a viscosity modifying agent.

Typically, the composition includes one or more surfactants. Suitable surfactants include calcium stearoyl lactylate, diglycerides, dioctyl sodium sulfosuccinate, hydroxypropyl cellulose, lecithin, monoglycerides, polysorbate 60, 65, and 80, a glycol such as propylene glycol, sodium hexametaphosphate, sodium lauryl sulfate, sodium stearoyl lactylate, sorbitan monostearate, or mixtures thereof.

An especially preferred composition includes a Maillard type colouring agent in combination with a methylcellulose and a glycol such as propylene glycol, preferably up to about 10 wt %, more preferably up to about 5 wt % glycol.

The composition may also include optionally other additives such as anti-oxidants and stabilizers.

It will be appreciated that the type of and amount of the components of the liquid composition may be selected according to the nature of the surface and also the food to be packaged therein. Consideration may be given to a desirable colour or flavour profile of different meat products with a view to consumer acceptance.

Alternatively, or in addition to the colouring or flavouring agents, the liquid may also include an antimicrobial agent, an antibacterial agent, a fungicide and/or an antiviral agent. It will be appreciated that incorporation of such agents need not be limited to use in food packaging and may have other applications.

The liquid may also consist essentially of water. The present inventor has surprisingly observed that when films which are typically quite stiff are treated according to the method of the present invention, the amount of water which may be absorbed is sufficient to alter the physical properties of the film such that the film is soft and pliable. An application of a softer film is in the food packaging industry where food products are stuffed into a tubular casing prior to being placed in a metal mould, which is typically of a square or rectangular cross section. Foods packaged and cooked in this way are referred to as moulded products. The flexibility of the film allows the film to conform to the shape of the mould. On the other hand, for some applications such as stuffing (where a food product is injected into a tubular casing and cooked to provide a product of circular cross section) a film having less flexibility may be desired.

The degree of flexibility may be controlled or modified by controlling the amount of liquid absorbed and/or formulating the film to provide at least two layers, a first layer into which the liquid is to be absorbed and a second water impermeable or barrier layer. It will be appreciated that such films may also include other layers. An example of such an arrangement is a film for use as a food packaging film having an inner layer of a hydrophilic material such as a polyamide material and a layer of a polyolefin material such as polypropylene, polyethylene or LLDPE.

The liquid may be applied to the surface by any suitable technique such as soaking or spraying. A suitable process for tubular casings is known in the art as slugging. Slugging is described in U.S. Pat. No. 3,378,379 and is used to apply a coating to absorbent cellulose casings. The conventional slugging method for coating the inside of a casing involves filling a portion of the casing with the coating material, so that a "slug" of material generally resides at the bottom of a "U" shape formed by the casing and then moving a continuous indefinite length of casing so that the slug of coating material remains confined within the casing, while the casing moves past the slug and is coated on its inside wall by the coating material contained within the slug. The film then passes between a pair of cog rollers.

Preferably, a modified slugging process is used to apply the liquid to the surface in which the slug is trapped between an upper and lower pair of nip rolls. The upper set of rolls preferably includes a chrome plated roller and a rubber roller. The rubber roller typically has a hardness of between about 60 to about 120, typically between about 70 to about 100 durometer. As the tube passes between the two sets of rolls, liquid is carried with the tube and the upper set of rolls act as metering rolls. In the embodiment of the invention, where the liquid consists essentially of water, it is preferred that the water include a viscosity increasing agent. Increasing the viscosity facilitates passage of the liquid towards the upper set of rolls.

Preferably the gap between the roller is set at less than the thickness of the tube, typically at about 50%. This is in contrast to conventional coating techniques where the gap is set equal to the tube thickness plus the desired thickness of the coating layer. Whilst not wishing to be bound by theory, it is believed that the pressure created as the tube passes between the rollers assists in forcing the liquid into the walls of the film. Typical levels of absorption are in the order of 20 to 35% by weight.

Food casings composed of the film of the present invention may be provided in any of the forms known in the art, such as in the form of shirred casing sticks, discrete short segments of flattened casings, continuous lengths of flattened casing on a reel and the like.

Where the film is in the form of a tubular casing, the tube is typically shirred after application of the liquid. Shirring may be accomplished by conventional shirring techniques as well known to those of skill in the art.

According to a further aspect of the invention, there is provided a shirred tubular food casing having an inner food contact surface coated with a liquid composition comprising at least one food additive for transfer to a food product encased therein, whereby prior to application of the composition to the surface, the surface has been subjected to a surface activation treatment.

After application of the liquid, the film may be used to package a food product by any suitable means. Where the package is in the form of a tubular casing or a shirred casing, the casing may be stuffed by pushing a meat product through a stuffing horn into the inside of the tubular casing.

A food product packaged within the film of the invention may be cooked by any suitable method such as boiling, heated by steam, or placed in an oven. Preferably, the packaged food is cooked as soon as possible after packaging. Alternatively, the packaged food product may be subjected to a pre-heating step so as to fix the colour prior to cooking. For example, the packaged product may be pre-heated to a temperature of between about 150° F. and about 200° F. for a period of up to about 6 minutes. During cooking, the food colouring additive can impart a colour to the surface of the food.

According to a further form of the invention, there is provided a method of processing a food product, the method including packaging the food product within a film of the first aspect of the invention which includes a colouring agent and heating the packaged article to a temperature at which colour from the colouring agent is transferred to the surface of the food product.

DETAILED DESCRIPTION OF THE INVENTION

EXAMPLE 1

Coating Formulations

Figure 1:
FIG. 1 shows a photograph of a ham packaged in a film of the invention as compared to a control ham.

Coating formulations were prepared by Red Arrow according to Table 1.

TABLE 1

| Coating Code | Coating Composition component | wt % |
|---|---|---|
| $C/C_{3/02}/$ $C_{1/03}$ | Maillose 45[1] | 94.63 |
| | Propylene Glycol | 5.00 |
| | Dioctyl Sulfosuccinate | 0.25 |
| | Xanthan Gum | 0.12 |
| $C_x$ | Liquid smoke[3] | 100.0 |
| $C_7$ | Maillose 45 | 94.875 |
| | Propylene Glycol | 5.00 |
| | Methocel[2] SGA16M | 0.125 |
| $C_9$ | Liquid smoke | 94.875 |
| | Propylene Glycol | 5.00 |
| | Methocel SGA16M | 0.125 |
| $C_{20}$ | Maillose45 | 98.4 |
| | Propylene Glycol | 1.4 |
| | Methocel K 100M | 0.2 |
| $C_{21}$ | Liquid smoke | 98.4 |
| | Propylene Glycol | 1.4 |
| | Methocel K 100M | 0.2 |

[1] Maillose 45 contains 27 wt % hydroxy acetaldehyde, is a colourant available from Arrow Products Co. LLC, Manitowoc, WI and formed by the pyrolysis of sugars.
[2] Methocel is methyl cellulose available from Dow.
[3] Liquid Smoke is a concentrated liquid smoke product having hydroxy acetaldehyde content of between about 30 to about 35 wt % and is available from Red Arrow Products Co. LLC, Manitowoc, WI.

EXAMPLE 2

Corona Treatment of a Polyamide Film

The following trials were conducted with a three layer heat shrinkable tubular film having an outer polyamide layer, an intermediate polypropylene copolymer layer and an inner polyamide layer. The inner layer is a blend of nylon 6 and about 16% PVPP. This film will be referred to hereinafter as DC-1.

The tubular film was internally corona treated at 600 W using an electrode arrangement similar to that as described in U.S. Pat. No. 5,296,170 in which one of a pair of electrodes is placed in contact with one side of an inflated tube. In this way, a corona discharge is generated in the air space within the tube. However, a significant difference between the method as described in U.S. Pat. No. 5,296,170 is that in the present case, much higher power levels are used. Although U.S. Pat. No. 5,296,170 does not describe the power level in watt density, the examples show an increase in dyne level of a polyethylene film from 31 dyne to 42 and 41 dyne. However, it may be estimated from this change in dyne level that a power of between about 18 and 23 watt was used. After corona treatment, the interior surface of the film was coated by slugging as described below:

1. The tube is slit open and an amount or "slug" of the liquid is added.
2. Air is injected to form the tube into a cylindrical shape and the slit is sealed with a tape.
3. The tube is advanced through and partially collapsed through a set of coating rolls. The rolls include a 72 durometer rubber roll and a chrome plated roll. The spacing between the coating rolls is adjustable such that the rolls are not totally closed and the gap is about 50% of the tube width. As the film with the liquid passes through the rolls, most of the liquid is squeezed out.
4. The film with the film absorbed on the inside surface is then wound into reels.

The level of surface activation was estimated by measuring the surface energy in dynes. The results are summarized in Table 2.

TABLE 2

| Corona Treatment | Dyne level | Watt-min/m2 | Add-on* $Mg/cm^2$ | Delta Add-on mg/cm2 | Increase % |
|---|---|---|---|---|---|
| None | 52 | 0 | 0.40 | 0 | 0 |
| Yes | 55** | ca76 | 0.46 | 0.06 | 15 |
| Yes | 66-70 | 228 | 0.67 | 0.27 | 67.5 |

*The amount of coating retained was measured by weighing the film before and after coating.
**A film treated to this level is referred to as DC1-AD1 hereafter. This film had been corona treated by a conventional corona treater used to treat tubular casings (as described in U.S. Pat. No. 5,296,170) to the maximumpower available. It is estimated from the measured dyne level that the watt density was in the order of 75 Watt-min/$M^2$.

The coating used was Coating C1, the components of which are provided in Table 1.

The results in Table 2 show a 67% increase in the amount of solution that can be absorbed into the inner layer and that the amount of coating that can be absorbed into the inner surface of the film was directly related to the level of corona treatment.

In the experiments it was observed that the surface activation was so high, that the dyne level was outside of the usual dyne measurement techniques. For this reason in future tests the level of surface activation was estimated in terms of watt density.

Watt density is calculated according to the following formula:

Watt density=power supply(watts)/Width of tube(M)× line speed min/M)

It may also be appreciated by a person of skill in the art that the above dyne levels are well in excess of that achieved by corona treatment as used to facilitate meat adhesion. It is generally accepted that level of between 40 to 50 dynes provide acceptable meat adhesion. It is also generally accepted in the field that if films are treated to a dyne level above about 50 dyne that the film unduly adheres to the meat surface. In the present instance it was surprisingly observed that despite these high levels of surface activation and contrary to expectations the meat film released cleanly from the meat surface without meat scarring.

To further demonstrate that the amount of liquid that can be absorbed into a polyamide film is a function of the corona treatment the film used in the tests of table 1 was treated to two different corona levels. Moisture was then applied to the film and the amount of moisture absorbed was determined per ASTM 570. This test requires specimens to be conditioned in an oven for 24 hours at 50° C. cooled in a desiccator, then immediately weighed to the nearest 0.001 g. After conditioning, the test specimens were immersed in distilled water that was maintained at room temperature (23+−1 C) for 72 hours. After the end of the test, the specimens were removed from the water, all surface water was wiped off with a dry cloth, and then weighed immediately to the nearest 0.0001 g.

To calculate the percentage increase in weight during immersion, the following equation was used:

$$\text{Increase in weight, \%} = \frac{(\text{Wet weight} - \text{Initial weight})}{\text{Initial weight}} \times 100$$

Table 3 show the results of the test.

TABLE 3

| Test | Casing Type | % Weight Gain | W-m/M$^2$ |
|---|---|---|---|
| 1 | DC-1 (no corona) | 12.9 | — |
| 2 | DC1-AD-1 | 14.7 | About 75 |
| 3*** | DC1-AD-1 | 18.7 | 189.3 |

***For test 3 the film of DC1-AD-1 the inner surface was further treated to the level indicated. It is estimated that the dyne level is 70 or higher at the watt density indicated but at these levels the dyne test cannot be used with any reliability.

The results indicate that corona treatment increases the amount of moisture that is absorbed as the corona level is increased.

To demonstrate that a solution that contains smoke colour is also absorbed when applied to the inner surface of the film the following test was devised:

Film samples were cut to fit circular hoops similar to those used to hold cloth when doing needle point. The inner surface of the film was placed in the hoop so that the rim of the hoop and the film formed a container. Before the film was clamped into the hoop.

The film specimens were clamped into the hoops. A solution that contains Maillose (C20) was added to the inner surface of a film of the structure polyamide/tie/polyamide. (This film will be referred to hereinafter as V9). The solution was added to just cover the surface of the film. This method insures that only the inner surface of the film has solution applied and closer simulates the slugging process. The specimen was left in contact with the solution for 72 hours.

The excess solution was poured from the hoop, the specimens were removed from the hoop and, all surface solution was wiped off with a dry cloth. The specimens were heated to 250 F for 30 minutes and then weighed to the nearest 0.0001 g.

Table 4 summarizes the results obtained for this test.

TABLE 4

| Material | Treatmentw-min/m2 | Absorption % |
|---|---|---|
| V9-control | 0 | 23.9% |
| V9-50 | 50 | 28.6% |
| V9-100 | 100 | 30.4% |
| V9-150 | 150 | 37.0% |
| V9-200 | 200 | 33.1% |
| V9-250 | 250 | 32.2% |
| V9-300 | 300 | 30.6% |
| V9-400 | 400 | 30.1% |
| V9-500 | 500 | 31.4% |

The results indicate that as the internal coronal level was increased the amount of solution that was absorbed also increased.

EXAMPLE 3

Shirring Stuffing and Processing

Films were activated and compositions applied thereto in a manner as described in Example 2. The films, after allowing time for the coating to attach and/or be absorbed onto the rolls were shirred into "sticks". Shirred tubular casings may be prepared by conventional shirring machines as known in the art.

Ham or turkey meat products were then pushed through a stuffing horn into the shirred casings.

The encased food products were then cooked by heating in an oven, with steam or hot water set for a length of time for the product to reach an internal temperature of 160 F. The oven was maintained at 100% relative humidity and a temperature of 185 F. The steam and hot water temperatures are noted in Table 3. Cooking was conducted as soon as practicable and at various times after stuffing as noted.

Controls were conducted in the absence of corona treatment and impregnation.

The results are summarized in Table 5.

TABLE 5

| Product Type | Composition Code | Colourant | Film Type | Inner Layer | Treatment W-M/m2 | Add On mg/cm2 | % increase in weight of film* | Colorimetric L Value | Comments |
|---|---|---|---|---|---|---|---|---|---|
| Bologna | C$_{20}$ | Maillose | DC-1 AD-1 | Nylon + PVPP | 318 | 0.67 | 26.35 | 53.21 | Uniform dry golden mahogany |
| Bologna | C$_{21}$ | Liquid Smoke | DC-1 AD-1 | Nylon + PVPP | 309 | 0.76 | 29.99 | 54.48 | Uniform dry golden brown |
| Bologna | None | None | DC-1 AD-1 | Nylon + PVPP | None | 0 | 0 | 65.57 | Uniform dry pale tan. |
| Ham | C$_9$ | Liquid Smoke | DC-1 AD-1 | Nylon + PVPP | 102.6 | 1 | 39.33 | 56.62 | Moulded 165° F. Water |
| Ham | C$_9$ | Liquid Smoke | DC-1 AD-1 | Nylon + PVPP | 102.6 | 1 | 39.33 | 53.18 | Moulded 195° F. Water |
| Ham | None | None | V-1 Control | LLDPE | None | 0 | 0 | 65.13 | Moulded 165° F. Water |

TABLE 5-continued

| Product Type | Composition Code | Colourant | Film Type | Inner Layer | Treatment W-M/m2 | Add On mg/cm2 | % increase in weight of film* | Colorimetric L Value | Comments |
|---|---|---|---|---|---|---|---|---|---|
| Turkey | $C_{3/02}$ | Maillose | DC1 AD1 | Nylon + PVPP | 300 | 0.42 | 16.62 | 67.4 | Uniform, light colour |
| Turkey | None | None | V1 Control | LLDPE | None | 0 | 0 | 75.1 | Uniform, light colour |
| Turkey | $C_7$ | Maillose | DC1 AD1 | Nylon + PVPP | 216.2 | 0.84 | 33.04 | 61.56 | Processed immediately 185° Steam |
| Turkey | $C_7$ | Maillose | DC1 AD1 | Nylon + PVPP | 216.2 | 0.84 | 33.04 | 69.78 | Held 4 hours 185° Steam |
| Turkey | $C_{1/03}$ | Maillose | DC1 AD1 | Nylon + PVPP | 289 | 0.82 | 33.04 | 67.99 | 1 Minute Hot Water Held 4 hours 185° Steam |
| Turkey | $C_{1/03}$ | Maillose | DC1 AD1 | Nylon + PVPP | 289 | 0.82 | 33.04 | 62.3 | 3 Minute Hot Water Held 4 hours 185° Steam |
| Turkey | $C_{1/03}$ | Maillose | DC1 AD1 | Nylon + PVPP | 289 | 0.82 |  | 61.8 | 6 Minute Hot Water Held 4 hours 185° Steam |
| Turkey | None | None | V-1 Control | LLDPE | None | 0 | 0 | 75.47 |  |
| Turkey | Cx | Liquid smoke | DC1 AD1 | Nylon + PVPP | 256 | 1.4 |  | 64.19 |  |
| Turkey | $C_9$ | Liquid Smoke | DC-1 AD-1 | Nylon + PVPP | 102.6 | 1 | 39.33 | 65.6 | Moulded 165° F. Water |
| Turkey | $C_9$ | Liquid Smoke | DC-1 AD-1 | Nylon + PVPP | 102.6 | 1 | 39.33 | 63.38 | Moulded 195° F. Water |
| Turkey | None | None | V-1 Control | LLDPE | None | 0 | 0 | 75.94 | Moulded 165° F. Water |
| Ham | C9 | Liquid smoke | V-1 control | LLDPE | 0 | 0 | 0 | 64.99 |  |
| Ham | C9 | Liquid smoke | Visflex | Nylon | 616.0 | 0.85 |  | 57.61 |  |
| Ham | C9 | Liquid Smoke | V9-2 | Nylon | 616.0 | 0.80 |  | 56.37 |  |
| Ham | C9 | Liquid Smoke | AD-1 | Nylon + PVP | 200.00 | 0.80 | 31.36 | 55.89 |  |
| Ham |  |  | Sun products | Absorbent Fibrous cellulose | None | None |  | 52.79 | Moulded 165F water |
| Ham | C9 | Liquid Smoke | AD-2 | Nylon | 308 | 0.93 |  | 51.40 |  |

L value - The lower the number, the greater the colour density
*The % weight increase of the film was calculated from the add on according to the formula:
% weight increase = add on ×100 wt 1 cm² (2.5423 mg)

Visflex is a commercially available film from Viskase and has the structure: nylon/EVA/nylon.

V9-2 is a commercially available film from Vector and has the structure: nylon/tie/nylon.

V1 is a commercially available film from Vector and has the structure: nylon/tie/LLDPE.

Sun Products is a commercially available absorbent plastic/cellulose laminate casing having a colorant solution absorbed therein.

It was discovered that the final colour transferred to the product is affected by the time between stuffing and processing. It is believed that this is because the heat of processing sets the colour on the product surface. If held before processing the colour compounds are absorbed into the meat product.

It was also observed that when the process was run without surface treatment that excessive pooling occurred above the upper coating rolls and liquid collected at low points of the tube. Further, the coated surface was wet to the touch and it was possible to wipe liquid from the surface. Although there was some add on and some color was transferred to the meat product, in practice the color transfer was streaky and quiet unacceptable indicating a non-uniform coating onto the surface. This non-uniform coating was insufficiently absorbed so as to be resistant to the subsequent shirring and stuffing operations. On the other hand, when the tube was corona treated, no pooling was observed. Also the inner surface of the tube did not feel wet, nor was it possible to wipe off any liquid from the treated surface. It is believed that these observations support the belief that the liquid is at least partially absorbed into the surface and not present as a discrete coating.

FIG. 1 shows a photograph of a ham packaged in a film of the invention as compared to a control ham.

Figure 2:
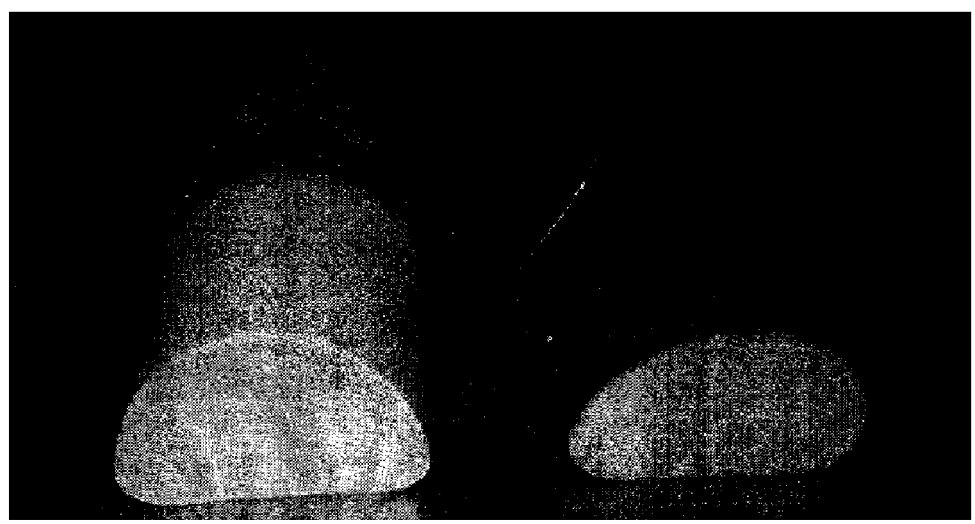
FIG. 2 shows a photograph of a turkey product packaged in a film of the invention as compared to a control turkey.
Figure 3:
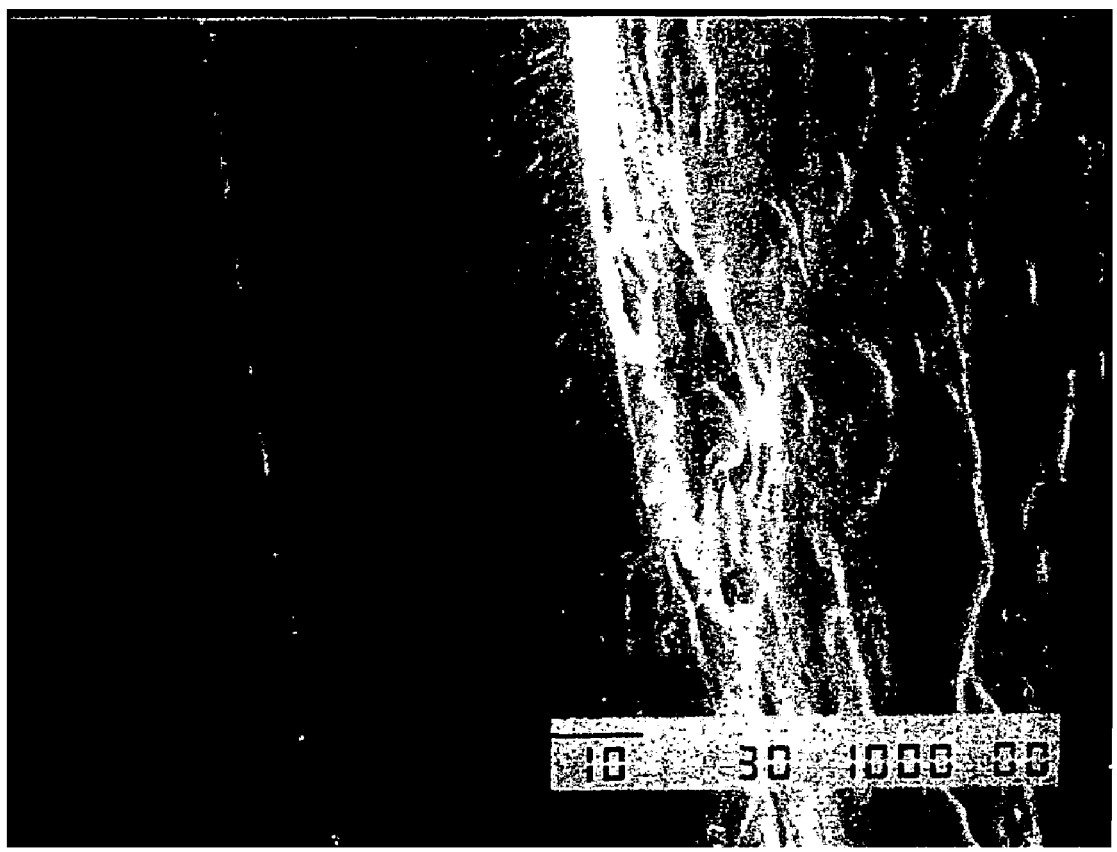
FIG. 3 shows a SEM of a film designated DC-1 AD-1.
Figure 4:
FIG. 4 shows a SEM of the film of FIG. 3 impregnated with a colouring composition.
Figure 5:
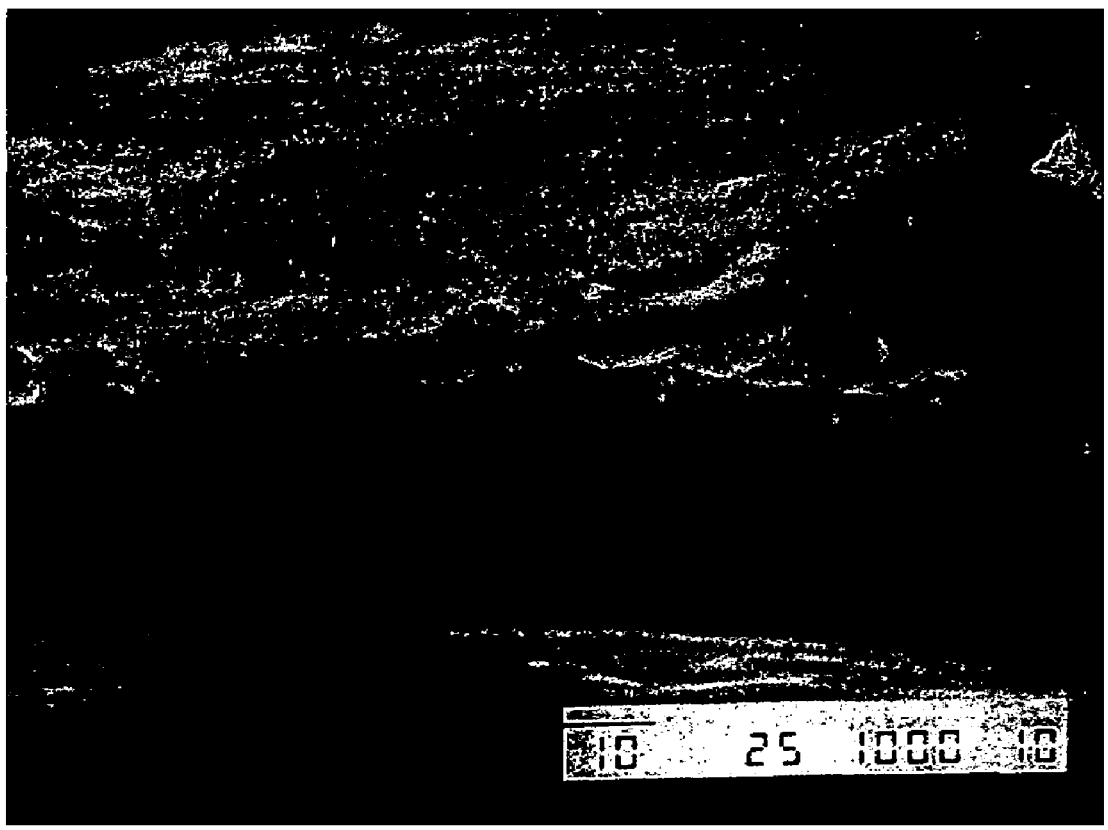
FIG. 5 shows a SEM of the film of FIG. 3 after methanol extraction.
Figure 6:
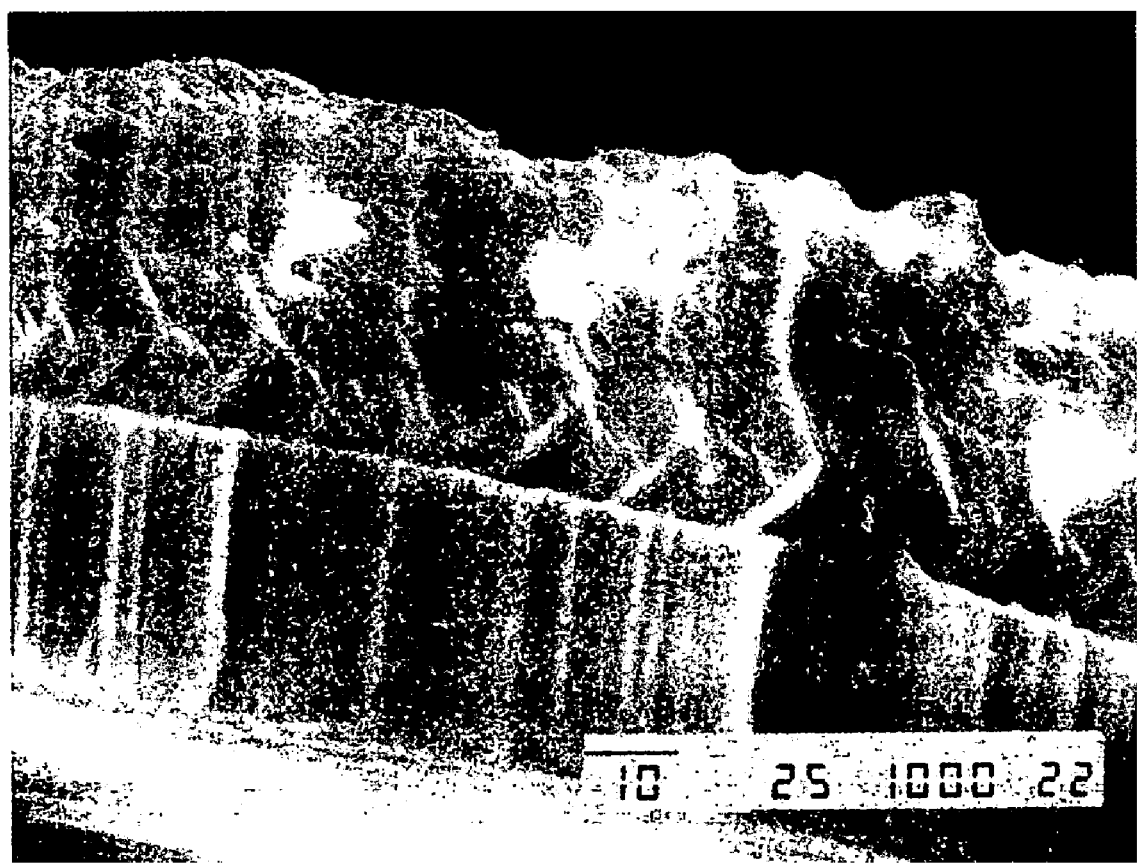
FIG. 6 is an SEM of the film of FIG. 4 after methanol extraction.

FIG. 2 shows a photograph of a turkey product packaged in a film of the invention as compared to a control turkey.

These figures show that both the ham and turkey products cooked in the film of the invention have a uniform smoked brown colour. Uniformity of colour indicates that the composition can not only be uniformly absorbed into the surface but this uniformity is resistant to disruption by the shirring and stuffing procedures. The absorbed liquid also has exhibited the flexibility to stretch during stuffing and shrink during heat shrinkage of the film. Still further, there is no evidence of purge, or cook-out, or an unacceptable adherence of the film to the meat product.

EXAMPLE 4

SEM Studies

In order to further investigate the absorption characteristics of a treated film scanning electron microscope studies were conducted on DC1, and DC1-AD-1 which had been treated to a power level of about 300 W-min/M² and composition C7 applied to the treated surface. Initial results showed that the principal difference between untreated and absorbed film was that a 10 micron thick nonporous inner layer with irregular surface morphology was changed into a 5 micron thick porous layer and a 5 micron thick nonporous innermost layer with irregular surface morphology. This indicated that the composition had absorbed into the inner film layer and impregnated the inner layer to a depth of about ½ the original thickness.

To confirm this, further SEM analysis was conducted on water and methanol extracted DC-1 AD-1 before and after liquid application to the inner surface. The results of the water and methanol extracted impregnated samples showed that extraction with water and methanol left physical demarcations on morphologies of impregnated film layers at approximately half the depth of their original cross sectional thickness. Exemplary SEM micrographs taken at 1000× magnification are shown in FIGS. 3, 4, 5 and 6 which show unimpregnated, impregnated, methanol extracted unimpregnated and methanol extracted impregnated films respectively.

It can be seen that the film and method described above, can provide a film saving a significant amount of a liquid absorbed therein. The tubular casing of the preferred embodiment is able to have a liquid applied evenly thereto. Further the tubular casing is able to undergo shirring, stuffing and cooking operations so as to provide an even transfer of additive to a food surface.

It will be appreciated that various changes and modifications may be made to the invention described herein without departing from the spirit and scope thereof.

The invention claimed is:

1. A nylon film consisting of (a) one or more aliphatic primary diamine and one or more aliphatic dicarboxylic acid, (b) an omega-aminocarboxylic acid, (c) an omega-aminocarboxylic lactam, or (d) a mixture of two or three of (a), (b), and (c), and having a liquid at least partially absorbed therein, wherein the liquid has been applied to a surface of the nylon film and prior to application of the liquid to the surface, the surface has been surface activated such that the surface has a dyne level of at least about 50 dynes and the amount of liquid able to be absorbed by the nylon film after said surface activation is higher than the amount able to be absorbed before said activation wherein the film is in the form of a tubular casing, and the surface is a food contact surface.

2. The film of claim 1, wherein the surface is activated by plasma treatment, flame treatment, corona discharge, UV irradiation, electron beam irradiation, or gamma irradiation.

3. The film of claim 1, wherein the surface is activated by corona discharge.

4. The film of claim 1, wherein the liquid has been applied to the surface in an amount of between about 0.4 to about 10 mg/cm$^2$.

5. The film of claim 1, wherein the liquid consists essentially of water.

6. The film of claim 1, wherein the liquid is a composition comprising at least one additive for transfer to a packaged food product.

7. The film of claim 6, wherein the additive is selected from the group consisting of a coloring agent, a flavoring agent, and a coloring and flavoring agent.

8. The film of claim 7, wherein the additive comprises a Maillard reagent.

9. The film of claim 1, wherein the liquid includes an agent selected from the group consisting of an antimicrobial agent, a fungicide, or an anti-viral agent.

10. The film of claim 1 having a second polyolefin layer.

11. The film of claim 1, wherein the nylon is nylon 6.

12. The film of claim 10 having a third outer nylon layer.

13. The film of claim 12, wherein the outer nylon layer is nylon 66.

14. The film of claim 1, wherein the liquid is absorbed to a depth of up to about one-half of a thickness of the nylon surface layer.

15. The film of claim 1, wherein the liquid is absorbed to a depth of up to about 5 microns of a thickness of the nylon surface layer.

16. The film of claim 1, wherein the surface layer is subjected to a surface activation treatment such that the surface has a watt density of at least 50 w-min/$^2$.

17. A nylon film consisting of (a) one or more aliphatic primary diamine and one or more aliphatic dicarboxylic acid, (b) an omega-aminocarboxylic acid, (c) an omega-aminocarboxylic lactam, or (d) a mixture of two or three of (a), (b), and (c), and having a liquid at least partially absorbed therein, wherein the liquid has been applied to a surface of the nylon film and prior to application of the liquid to the surface, the surface has been surface activated by the application of energy such that the surface has a dyne level of at least about 50 dynes and the surface receives energy of a watt density of at least about 75 W-min/m$^2$ and the amount of liquid able to be absorbed by the nylon film after said surface activation is higher than the amount able to be absorbed before said activation wherein the film is in the form of a tubular casing, and the surface is a food contact surface.

18. The nylon film of claim 17, wherein the surface receives energy of a watt density of up to about 500 W-min/m$^2$.

19. The nylon film of claim 17, wherein the liquid is absorbed up to about one-half of a thickness of the nylon film.

20. The film of claim 1 wherein the surface has a dyne level of at least 70 dynes.

* * * * *